J. K. WILLIAMS.
LEMON SQUEEZER.
APPLICATION FILED JULY 22, 1913.
1,117,122.
Patented Nov. 10, 1914.
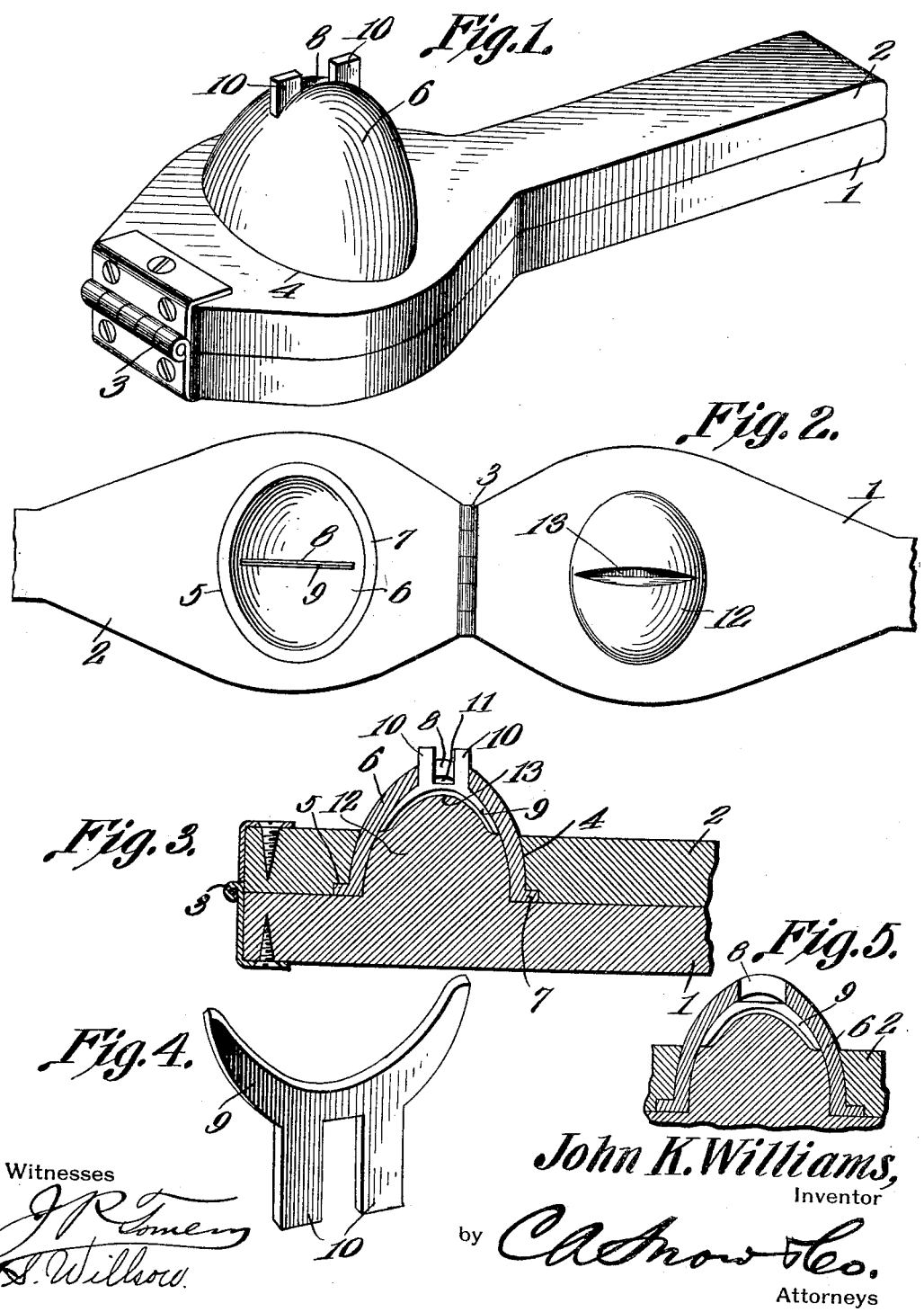

UNITED STATES PATENT OFFICE.

JOHN K. WILLIAMS, OF JACKSONVILLE, FLORIDA.

LEMON-SQUEEZER.

1,117,122.     Specification of Letters Patent.     Patented Nov. 10, 1914.

Application filed July 22, 1913. Serial No. 780,560.

*To all whom it may concern:*

Be it known that I, JOHN K. WILLIAMS, a citizen of the United States, residing at Jacksonville, in the county of Duval and State of Florida, have invented a new and useful Lemon-Squeezer, of which the following is a specification.

My invention relates to new and useful improvements in a device for squeezing lemons, limes and the like, and has for its primary object the provision of a device of this character which will both cut and squeeze the lemon or the like.

A further object of the invention is the provision of a squeezer so constructed that it can be easily cleaned.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is an inverted perspective view. Fig. 2 is a plan view of the squeezer open, the ends being broken away. Fig. 3 is a longitudinal sectional view. Fig. 4 is a detail view of the knife. Fig. 5 is a detail longitudinal sectional view of a slightly modified form of the invention.

The squeezer comprises the two members 1 and 2 which are connected together at one end by means of the hinge 3. The member 2 has an opening 4 formed therein and the edge of the opening is cut away to form the seat 5 more clearly shown in Fig 3 of the drawing. A lemon receiving cup 6 extends through the opening in the member 2 and is provided with a flange 7 which is adapted to engage the seat 5. An opening 8 is formed in the bottom of the cup and a curved knife 9 is received in the cup and has a forked projection 10 which passes through the opening 8 in the cup. As is clearly shown in Fig. 3 of the drawing, the edges of the knife engage the side of the cup and hold the bottom of the knife a short distance from the bottom of the cup and leaving the space 11 between the knife and opening 8 in the cup. This space 11 allows the juice to pass from the cup through the opening 8 and the knife is in such a position with relation to the opening as to prevent the seed from passing therethrough. A projection 12 is formed on the member 1 and is of such a shape as to be received in the cup 6 and substantially fill the same. A groove 13 is cut across the top of the projection and when the projection is in the cup will receive the top of the knife.

Having fully described the detailed construction of my device it is thought that the operation will be clearly understood. A whole lemon, lime or the like, is placed in the cup and when the members 1 and 2 are brought together the projection 12 engaging the lemon will force it against the knife thereby cutting the same and at the same time squeezing the lemon between the projection and cup. The juice will pass beneath the knife entering the space 11 and will then pass out through the opening 8 in the bottom of the cup. The seeds will be prevented from passing through the opening and when the lemon has been sufficiently squeezed the member 1 is raised and the skins and seeds can be removed. It will be noted that the cup can be easily removed from the member 2 for washing the same and that the knife is also removable for cleaning. The single opening 8 in the bottom of the cup is of particular advantage as it will prevent any clogging of the cup.

In Fig. 5 of the drawings I have shown a slightly modified form of the invention in which the knife 9 is formed integral with the cup 6 and in this form of the invention I do away with the projection 10 on the knife. It will be noted that the knife extends over the opening 8 and leaves a space through which the juice passes.

Having fully described the invention what I claim as new and desire to secure by Letters Patent is:—

A lemon squeezer comprising two hinged members, a lemon receiving cup carried by one of the members and having an opening in the bottom, a curved knife received in the cup and above the opening, the curvature of the knife being such that the ends will engage the cup and hold the knife above the bottom of the cup, said knife having a forked projection thereon passing through the opening in the cup and a projection on the opposite hinged member adapted to enter the cup.

In testimony that I claim the foregoing as my own, I have hereto affixed my signature in the presence of two witnesses.

JOHN K. WILLIAMS.

Witnesses:
JOSEPH B. DAVIS,
H. M. EVANS.

Copies of this patent may be obtained for five cents each, by addressing the "Commissioner of Patents, Washington, D. C."